United States Patent
Zhang

(10) Patent No.: US 9,634,900 B2
(45) Date of Patent: Apr. 25, 2017

(54) DECLARATIVE APPROACH TO VIRTUAL NETWORK CREATION AND OPERATION

(71) Applicant: Futurewei Technologies, Inc., Plano, TX (US)

(72) Inventor: Shujin Zhang, San Carlos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 14/193,034

(22) Filed: Feb. 28, 2014

(65) Prior Publication Data

US 2015/0249574 A1 Sep. 3, 2015

(51) Int. Cl.
| | | |
|---|---|---|
| *G06F 15/173* | (2006.01) | |
| *H04L 12/24* | (2006.01) | |
| *G06F 9/54* | (2006.01) | |
| *H04L 12/46* | (2006.01) | |

(52) U.S. Cl.
CPC ............. *H04L 41/12* (2013.01); *G06F 9/54* (2013.01); *H04L 12/4641* (2013.01); *H04L 41/26* (2013.01)

(58) Field of Classification Search
CPC ...................................................... H04L 41/12
USPC .................. 709/223, 217; 717/137; 719/328
See application file for complete search history.

(56) References Cited

U.S. PATENT DOCUMENTS

| | | | | | |
|---|---|---|---|---|---|
| 7,426,734 B2* | 9/2008 | Debique | .................... | G06F 8/20 | |
| | | | | 718/104 | |
| 7,607,128 B2* | 10/2009 | Arthurs | .................... | G06F 9/443 | |
| | | | | 718/1 | |
| 7,921,432 B2* | 4/2011 | Tolgu | ...................... | G06F 9/541 | |
| | | | | 717/136 | |
| 8,370,391 B2 | 2/2013 | Lammel et al. | | | |
| 8,607,224 B2 | 12/2013 | Kohler et al. | | | |
| 8,972,489 B2* | 3/2015 | Gregorio | .................... | G06F 8/30 | |
| | | | | 709/201 | |
| 9,003,141 B2* | 4/2015 | Nielsen | ............... | G06F 11/1438 | |
| | | | | 711/162 | |
| 2010/0083287 A1* | 4/2010 | Maximilien | ............. | G06F 8/31 | |
| | | | | 719/328 | |

(Continued)

FOREIGN PATENT DOCUMENTS

WO 2013119841 A1 8/2013

OTHER PUBLICATIONS

Foreign Communication From A Counterpart Application, PCT Application No. PCT/CN2015/073307, International Search Report dated May 28, 2015, 7 pages.

(Continued)

*Primary Examiner* — David Lazaro
*Assistant Examiner* — Marie Georges Henry
(74) *Attorney, Agent, or Firm* — Conley Rose, P.C.

(57) ABSTRACT

A network controller may receive a request from an application via an application programming interface (API), wherein the request comprises program codes written in a declarative programming language, and wherein the program codes describe at least some aspects of a virtual network (VN). The network controller may further parse the program codes into internal objects of the network controller, with the internal objects representing the aspects of the VN described by the program codes. The network controller may then manage the VN according to the internal objects translated from the program codes.

19 Claims, 9 Drawing Sheets

(56) References Cited

U.S. PATENT DOCUMENTS

| | | | |
|---|---|---|---|
| 2010/0115606 A1* | 5/2010 | Samovskiy | H04L 12/4641 726/15 |
| 2010/0208619 A1 | 8/2010 | Ho et al. | |
| 2012/0322468 A1 | 12/2012 | Cai et al. | |
| 2013/0086116 A1 | 4/2013 | Agarwal et al. | |
| 2013/0250770 A1 | 9/2013 | Zou et al. | |
| 2014/0033268 A1 | 1/2014 | Julisch et al. | |

OTHER PUBLICATIONS

Foreign Communication From A Counterpart Application, PCT Application No. PCT/CN2015/073307, Written Opinion dated May 28, 2015, 5 pages.
Hewlett-Packard, "Annex A: Relationship to SDN," NFVSWA (14)000087, Feb. 19, 2014, 7 pages.
Ceccarelli, D., et al., "Framework for Abstraction and Control of Transport Networks," draft-ceccarelli-actn-framework-01.txt, Feb. 14, 2014, 27 pages.
Jesus, W., et al., "ProViNet—An Open Platform for Programmable Virtual Network Management," IEEE 37th Annual computer Software and Applications Conference, Jul. 22, 2013, 10 pages.
Foreign Communication From a Counterpart Application, European Application No. 15755432.0, Extended European Search Report dated Jan. 23, 2017, 10 pages.

* cited by examiner

```
%create network red
%add node 1 to red
%add node 2 to red
%add port 1 to node 1
%add port 2 to node 2
%add link between port 1 and port2
% if link down, then...
```

```
<?xml version="1.0" encoding="ISO-8859-1" ?>
<xs:schema xmlns:xs="http://www.w3.org/2001/XMLSchema">
<xs:element name="network">
    .....
    <xs:complexType>
    <xs:sequence>
        <xs:element name="link"/>  ← 522
        <xs:complexType>
        <xs:sequence>
            <xs:element name="from" type="xs:string"/>     ← 523
            <xs:element name="to" type="xs:string"/>       ← 524
            <xs:element name="bandwidth" type="xs:string"/> ← 525
        </xs:sequence>
        </xs:complexType>
    </xs:element>
    </xs:complexType>
    <xs:sequence>
</xs:element>
</xs:schema>
```

```
<NETWORK name="Test">
  <NODE name="1"><PORT name="1"></PORT><PORT name="2"></PORT></NODE>
  <NODE name="2"><PORT name="1"></PORT><PORT name="2"></PORT></NODE>
  <NODE name="3"><PORT name="1"></PORT><PORT name="2"></PORT><PORT name="3"></PORT>
    <PORT name="4"></PORT><PORT name="5"></PORT></NODE>
  <NODE name="4"><PORT name="1"></PORT><PORT name="2"></PORT><PORT name="3"></PORT></NODE>
  <NODE name="5"><PORT name="1"></PORT><PORT name="2"></PORT></PORT>
    <PORT name="3"></PORT><PORT name="4"></PORT></NODE>              ← 610
  <NODE name="6"><PORT name="1"></PORT><PORT name="2"></PORT> <PORT name="3"></PORT></NODE>
  <NODE name="7"><PORT name="1"></PORT><PORT name="2"></PORT> <PORT name="3"></PORT></NODE>
    <PORT name="3"></PORT><PORT name="4"></PORT></NODE>
  <LINK 1.2=3.1><BW>1G</BW></LINK>    ← 620
  <LINK 2.2=3.2></LINK>
  <LINK 3.3=4.1></LINK>
  <LINK 3.5=5.1><BW>10G</BW></LINK>
  <LINK 3.4=6.1></LINK>
  <LINK 4.2=5.2></LINK>
  <LINK 5.3=6.2></LINK>
  <LINK 4.3=7.2></LINK>
  <LINK 5.4=7.1></LINK>
  <LINK 6.3=7.3></LINK>
</NETWORK>
```

FIG. 6A

DECLARATIVE APPROACH TO VIRTUAL NETWORK CREATION AND OPERATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual network (VN) is a computer network that comprises virtual network nodes and/or links. The concept and adoption of virtual networks (VNs) have become widely popular due to various reasons such as the need for rapid service introduction and savings of operational cost in cloud computing. A VN may be formed with or without a corresponding physical network topology. To create and operate a VN, network applications may call an application programming interface (API) provided by a network controller controlling the VN. For example, requests from an application may be transmitted to the controller via the API one at a time, and a VN may be built or updated according to the request to fit the need of the application.

Application developers today may use a procedural approach to operate a VN. In this approach, an application may use a controller API to build a step-by-step procedure that represents application logic for operating the VN. Building the procedural steps may require application developers to have intimate knowledge of the VN (e.g., how the VN is built). As the scale and complexity of a VN grows, the VN may become increasingly difficult to manage for application developers.

SUMMARY

Disclosed example embodiments may help improve virtual network (VN) management by using program codes written in a declarative programming language rather than a procedural programming language in order to perform various VN-related tasks. In an example embodiment, a network controller may start managing a VN by receiving a request via an application programming interface (API), wherein the request comprises program codes written in a declarative programming language, and wherein the program codes describe at least some aspects of a VN. The network controller may further parsing the program codes into internal objects of the network controller, with the internal objects representing the aspects of the VN described by the program codes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A and 5B illustrate an exemplary extensible markup language (XML) schema that describes at least some aspects of a VN.

FIG. 6A illustrates an exemplary piece of program codes that describes an exemplary VN.

DETAILED DESCRIPTION

Figure 1:
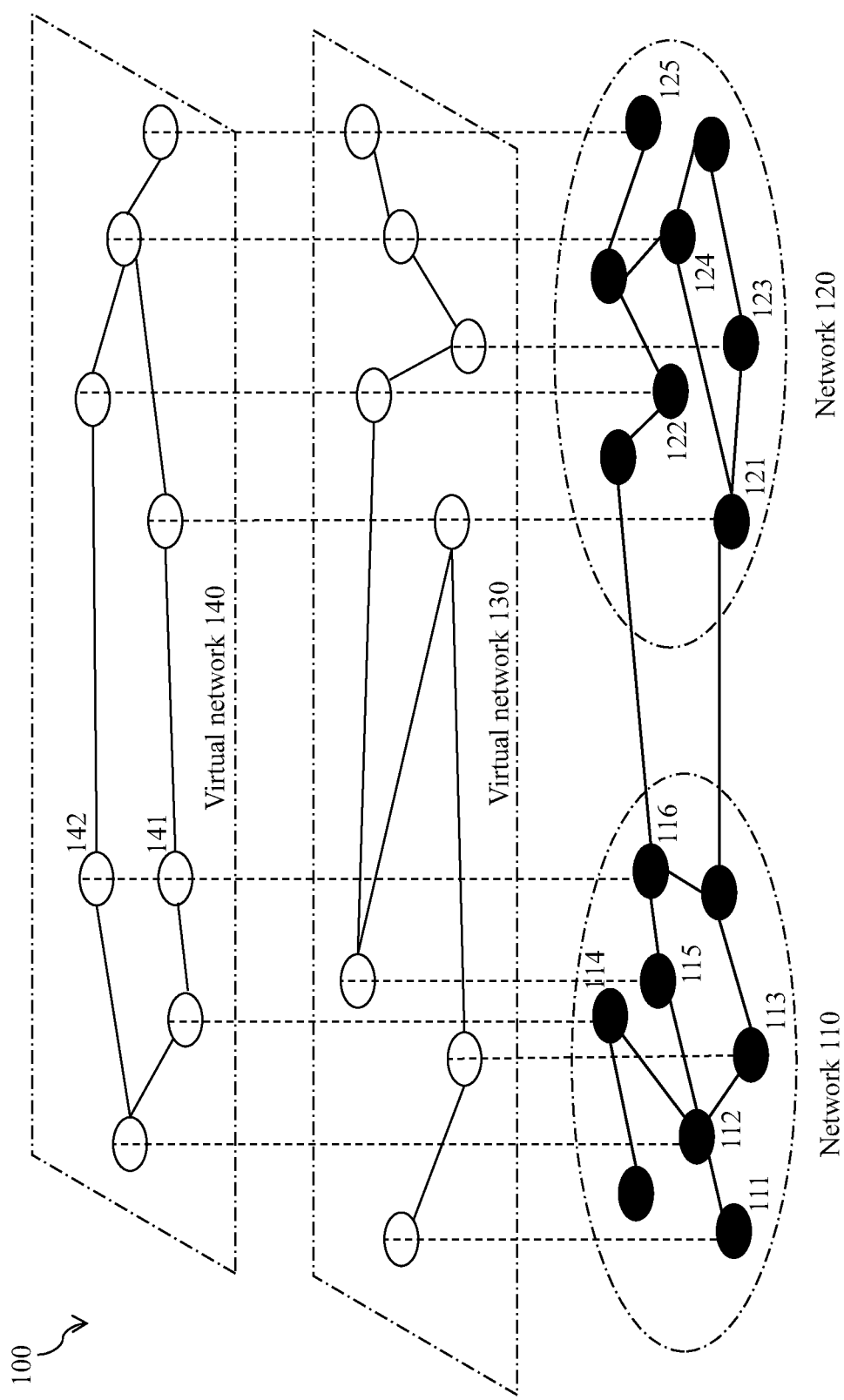
FIG. 1 is a schematic diagram showing an example embodiment of a network model.

It should be understood at the outset that, although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To manage a virtual network (VN), a network controller may provide an application programming interface (API) to interact with applications that are operated by application developers. There have been efforts in standardizing API formats. For example, Elastic Compute Cloud (EC2) proposed by AMAZON may be considered a de facto standard for API, and OpenStack Quantum API may be considered a variation of the EC2 API. New proposals are also in progress trying to expand the API to incorporate new features or application scenarios.

Some of the existing API approaches share a few common traits. First, the APIs may be descriptive. One API may represent an action or task that applications instruct the network controller to perform, and application developers may provide input parameters for the task and expect a result after the API call is complete. Second, the APIs may be procedural. Applications may use an API to build a procedure that represent the application logic, thus application developers may need to have intimate knowledge of how a virtual network is built via the procedural steps. As the scale and complexity of a VN grows, application developers may write long and complicated program codes to create and operate the VN. Further, it may become costly to maintain the VN and avoid potential bugs or errors.

The present disclosure teaches example embodiments to address weakness of the current APIs by using a declarative approach rather than a procedural approach in creating and operating a VN. Specifically, requests or commands comprising program codes may be generated using a declarative programming language rather than a procedural programming language. The declarative language, sometimes referred to herein as a virtual network definition language (VNDL), may be written in various formats or schemas such as an extensible markup language (XML) format. An application developer may use VNDL to describe a VN in terms of defined names such as node, port, link, bandwidth, policy, and event handling. Unlike a procedural programming language, the VNDL may specify logics or objectives of a task without having to explicitly specify each detailed step in order to perform a task.

Program codes written in VNDL may be generated by an application and then be sent to a network controller via an API supported by the network controller. The network controller may parse the VNDL code into internal objects and execute accordingly using an internal API of the controller. The network controller may perform various tasks to operate a VN, including creating the VN (e.g., defining nodes, ports, and links), updating the VN, enforcing network policies of the VN, and handling events occurring in the VN.

FIG. 1 is a schematic diagram showing an example embodiment of a network model 100, which comprises one or more VNs configured over a physical network layer. As shown in FIG. 1, the physical network layer comprises a network 110 and a network 120, which may be considered different networks or different domains of the same network. The networks 110 and 120 comprise physical network nodes, which may be interconnected with one another via physical links. Physical network nodes in the networks 110 and 120 may be interconnected with other network nodes both in and out of the home network.

To expand networking functionalities, one or more VNs may be formed using some of the network nodes in the physical network layer. For example, a first VN 130 may be configured using network nodes 111, 113, 115, and 121-125, and a second VN 140 may be configured using network nodes 112, 114, 116, 121-122, and 124-125. In practice, part of physical node functionalities may be used to form virtual network nodes, which in turn may make up the VNs. Therefore, one physical node may be used to construct one or more virtual nodes. As shown in FIG. 1, two virtual nodes 141 and 142, both belonging to the VN 140, are formed sharing the same physical node 116. Virtual links may interconnect virtual nodes to one another. However it is also possible to have virtual nodes without any connections. It should be understood that the physical/virtual network nodes and links discussed herein may be implemented using any suitable techniques. Depending on the application, a VN may sometimes be referred to by equivalent or similar names. For example, a VN may be implemented as a virtual private network (VPN), a software-defined network (SDN), a service-centric network (SCN), an information-centric network (ICN), a content-centric network (CCN), a virtual carrier network, a virtual enterprise network, an application specific network, and so forth. Thus, the term VN as disclosed herein may encompass these equivalents and variations.

Figure 2:
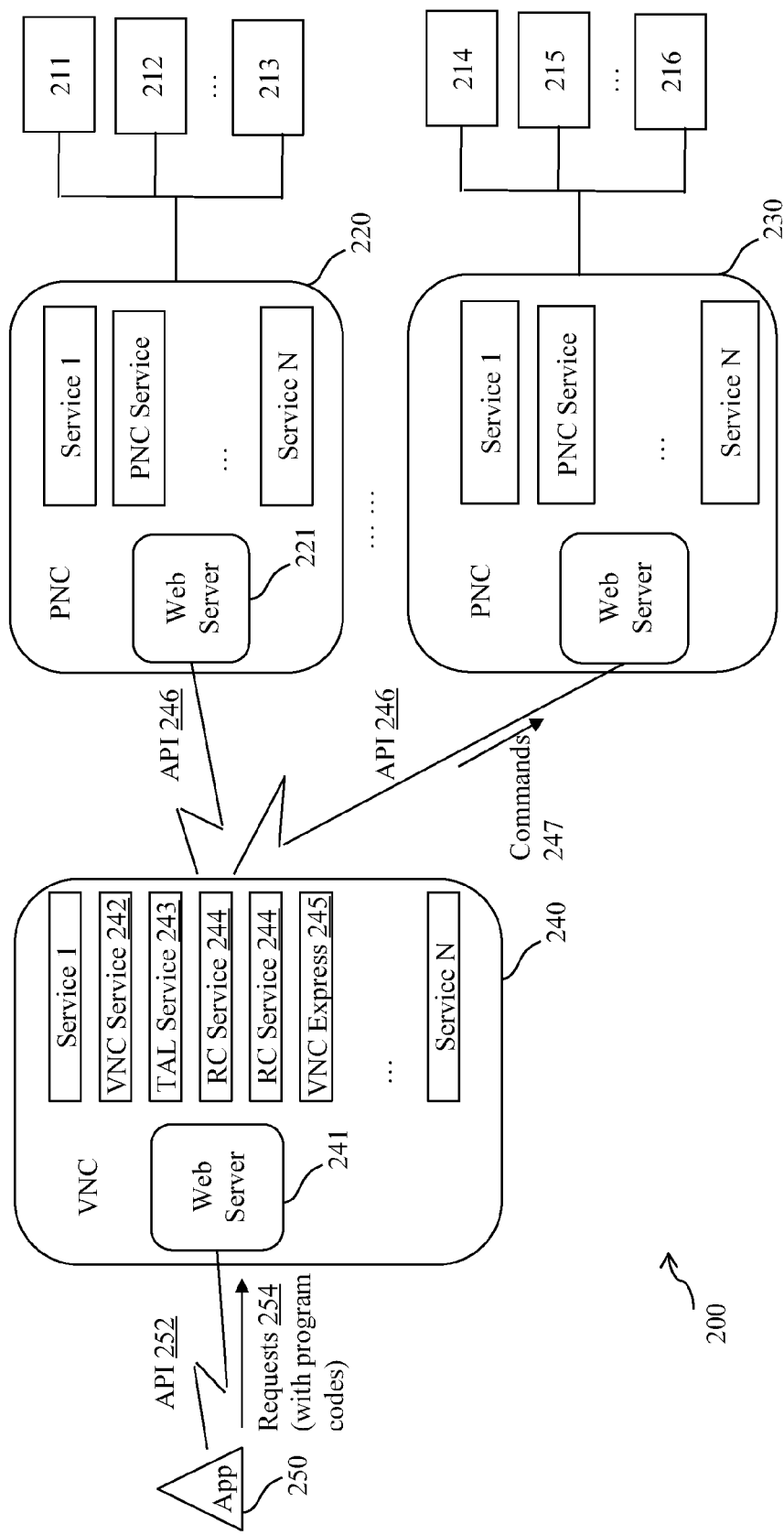
FIG. 2 is a schematic diagram showing an example embodiment of a virtual network (VN) solution architecture.

To manage a network comprising multiple network nodes, a network controller may be set up as a central entity that oversees the network. This architecture may be used in both physical and virtual networks. FIG. 2 is a schematic diagram showing an example embodiment of a VN solution architecture 200, which encompasses both physical and virtual network layers. In large networks or network domains, multiple network controllers may be deployed each overseeing a portion of the whole network(s). As shown in FIG. 2, a first physical network controller (PNC) 220 may be configured to manage a first plurality of physical network nodes 211, 212, and 213, while a second PNC 230 may be configured to manage a second plurality of physical network nodes 214, 215, and 216. The network nodes 211-216 may be implemented to have any function, such as versatile routing platforms (VRPs). Each PNC comprises various modules or units. For example, the PNC 220 may comprise a web server 221 and a plurality of service modules performing PNC service and other services.

In practice, a relatively large network may be divided into multiple pieces of smaller networks or domains, each of which may be managed by a PNC. Multiple PNCs such as PNCs 220 and 230 may be further managed by a higher-level network controller, e.g., a VN controller (VNC) 240 shown in FIG. 2, to create a two-layer controller hierarchy. Note that more layers or levels can be constructed if desired. An application (app) 250 may access and control network resources via the PNC 220, the PNC 230, and/or the VNC 240, which may be implemented using an open platform server (OPS). The VNC 240 may communicate with lower-level controllers such as the PNC 230 via an API 246, e.g., by transmitting requests or commands 247 to the PNC 230. Note that the controllers 220, 230, and 240 may be located at the same physical location (centralized setting) or at different locations (distributed setting). The application 250 may be implemented as any suitable form of software program running on network device or node that is operated by an application developer.

The VNC 240 may be an application that coordinates with multiple PNCs. The VNC 240 may offer many different types of services that benefit application developers, such as providing a higher-level interface for applications to create, configure, update, and operate VNs. In an example embodiment, the VNC 240 comprises various modules to perform various tasks, and the modules may include a web server 241, a VNC service module 242, a topology abstraction layer (TAL) service module 243, one or more route calculation (RC) service modules 244, a VNC express module 245, and other service modules. The web server 241 may interact with the application 250 via an API 252. Specifically, the web server 241 may be embedded in the VNC 240 to receive requests 254 (e.g., RESTful API requests), and then dispatch the requests 254 to other modules in the VNC 240. The requests 254 may comprise program codes written in VNDL for operating the network. The VNC service module 242 may facilitate management of the PNCs 220 and 230. Additionally, the TAL service module 243 may collect topology from each PNC and then combine multiple topologies into a single topology of the whole network. Application developers may use the topology as an assistance tool to build VNs of large sizes, e.g., those spanning across multiple physical networks.

The RC service modules 244 may provide implementation choices for the API 252, which may have parameters for the choice of implementation to use for the API handling. The VNC express 245 module may allow application developer to write program codes using a declarative programming language, and use the program codes to facilitate VN creation and operation. From a practical perspective, application developers may view a VNC or a PNC as a SDN controller. For example, the VNC 240 may be considered a SDN controller for accessing physical network resources. The VNC 240 may provide any suitable type of API to communicate with application developers and other network devices. For instance, the API 252 and/or the API 246 may be a REST or RESTful API, such as EC2 proposed by AMAZON and OpenStack, which is a stateless type of API. Note that the APIs 246 and 252 may be of the same type or different types. Further, API formats may be different even if they are the same type since each vendor may choose to add new functions. In practice, different controllers may have different APIs. Although the present disclosure is mostly stated in the context of RESTful API for controllers such as the VNC 240 and PNCs 220 and 230, any other suitable type of API may be used as long as the application 250 may send program codes written in the VNDL to the controllers such as the VNC 240.

Figures 3A, 3B:
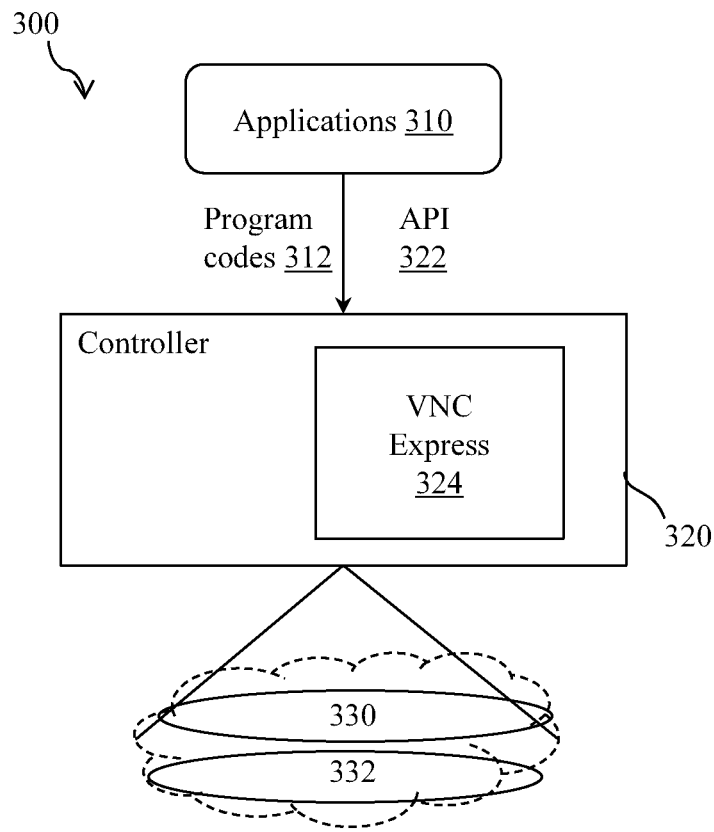
FIG. 3A is a schematic diagram showing an example embodiment of a VN communication architecture.
FIG. 3B illustrates an exemplary piece of pseudo codes written in a procedural approach.

FIG. 3A is a schematic diagram showing an example embodiment of a VN communication architecture 300. One of ordinary skill in the art will understand similarities between the architecture 200 and 300, thus in the interest of conciseness further descriptions will focus on aspects that are different or yet to be covered (same principle applies to other figures). One or more applications 310 may communicate with a controller 320 via an API 322. The controller 320 may be a VNC (e.g., the VNC 240) that manages a VN 330 overlaid on a physical network 332. In practice, the applications 310 may be implemented using any suitable type of software and may run on physical and/or virtual nodes.

In an example embodiment, developers using the applications 310 may write program codes 312 in a declarative programming language. The program codes 312 may be sent via the API 322 to the controller 320, which may comprise a VNC express module or unit 324. After receiving a program code written in the declarative programming language, the VNC express module 324 may perform various tasks on the program codes. The declarative programming language, referred to herein sometimes as VNDL, may take the form of any suitable format such as an XML format, so terms or legal names may be defined by an XML schema. The VNDL allows application developers to describe a VN.

The declarative approach disclosed herein for operating a VN may be advantageous over a conventional procedural approach. FIG. 3B illustrates an exemplary piece of pseudo codes 350 written in a procedural approach. Program codes written in a procedural programming language may need to explicitly specify each detailed step in order to perform a task. As shown in FIG. 3B, to create a network named "red", pseudo codes 350 specify each step of adding nodes, ports on the nodes, and links between the ports. Further, to handle an event (e.g., if a link goes down) occurring in the network "red", the pseudo codes 350 need to specify exact steps of how to handle the event. Thus, the conventional procedural approach may require an application developer to intimately understand details of a VN. In contrast, operating a VN using a declarative programming language taught herein may avoid such issues by not requiring specification of each detailed step.

In computer science, declarative programming may be considered a programming paradigm or a style of building computer programs, in which program codes express the logic of a computation without having to describe detailed control flow. This declarative approach may minimize or eliminate side effects by describing what the program should accomplish in terms of logics and goals, rather than describing how to accomplish it as a sequence of programming language primitives. The details of how to accomplish it can be left to another device (e.g., VNC controller) to determine.

It should be understood that there is a host of programming languages that can be classified or categorized as declarative programming languages. The category of declarative programming languages comprises subcategories including declarative markup languages, functional languages, logic programming languages, and functional logic programming languages. Specific examples of declarative programming languages include, but are not limited to, Alpha, Atom, Applied Type System (ATS), Curl, Distributed Application Specification Language, data-centric programming language known as ECL, Erlang, Extensible Application Markup Language (XAML), frame logic (F-logic), FXML, General-purpose Declarative Language (GenDL), Glowe, GOAL agent programming language, Good For Equational Reasoning (Gofer) language, Knowledge Machine (KM) programming language, Lithe, Lucid, Lustre, Miranda, Pan, Qi, XML, QUILL, SequenceL, Structured Query Language (SQL), Synchronized Multimedia Integration Language (SMIL), and Web Ontology Language (OWL), and combinations thereof. On the other hand, examples of procedural programming language, sometimes referred to as imperative programming language, may include Visual Basic, C, C++, Common Business-Oriented Language (COBOL), Java, Perl, Python, and open-source server-side scripting language known as PHP. Further, it should be understood that the declarative approach disclosed herein may be compatible with existing procedural approaches and may be used as a complementary technology in certain situations.

Figure 4:
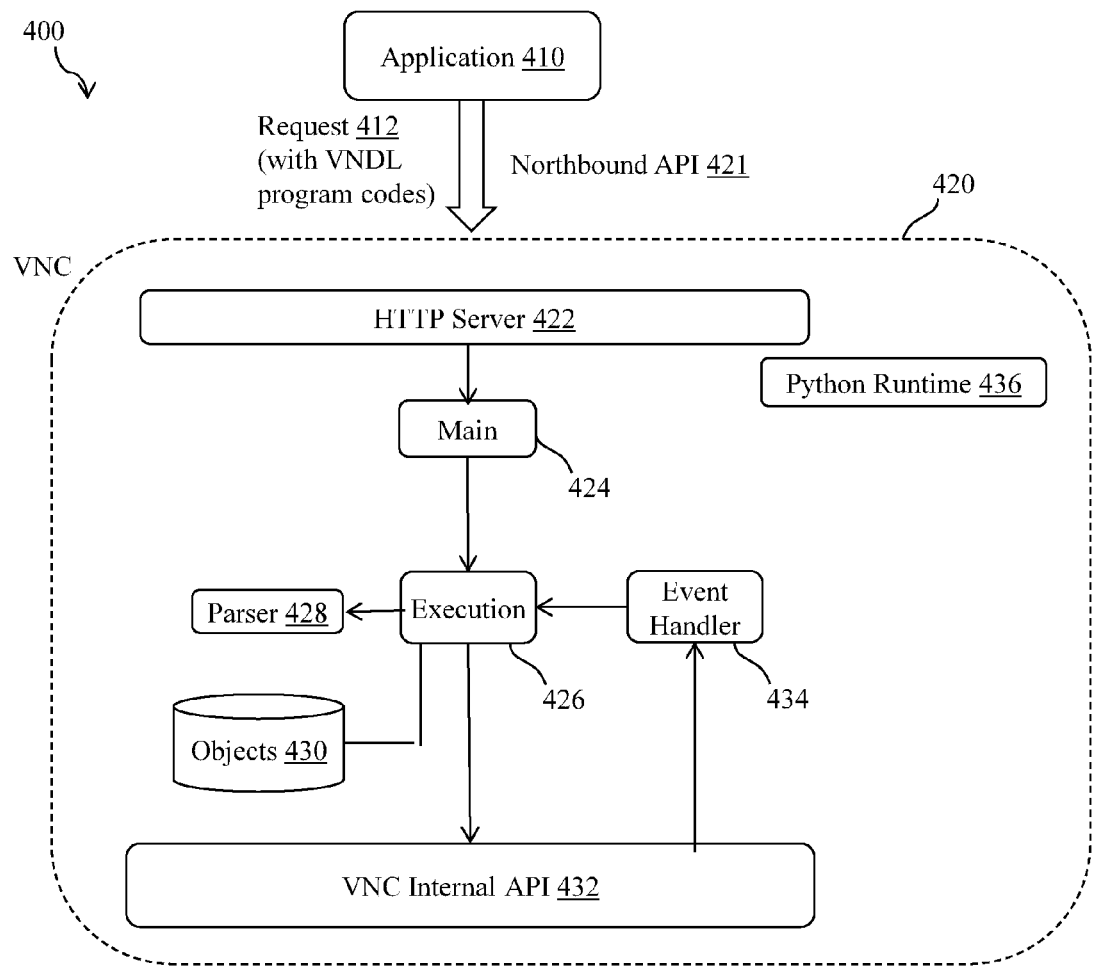
FIG. 4 is a schematic diagram showing an example embodiment of a communication architecture between an application and a network controller.

FIG. 4 is a schematic diagram showing an example embodiment of a communication architecture 400 between an application 410 and a network controller 420. The network controller 420 may be implemented as the VNC 240 or the controller 320, and its parts illustrated in FIG. 4 may be implemented by a VNC express module and other relevant modules. In an example embodiment, the application 410 may generate commands or requests written in VNDL for various VN tasks. For instance, an application developer may write requests using the application 410 in order to create and/or operate a VN. The application 410 may call the controller 420 by sending a command or a request 412 comprising program codes written in VNDL. The request 412 may be packaged or formatted using any suitable form, and the program codes therein may have any suitable format or length (e.g., containing scripts, strings, or codes). The application 410 may transmit the request 412 via a northbound API 421, which may be a stateless or RESTful API.

A Hypertext Transfer Protocol (HTTP) server 422 embedded in the controller 420 may receive the request 412 from the application 410. The request 412 containing VNDL codes may then be passed to a main module 424, which may start and/or coordinate the translation process, e.g., by passing the VNDL codes to an execution module 426. The execution module 426 may then pass the VN codes to a parser 428 for parsing the VNDL codes. During parsing, the VNDL codes may be translated or converted into internal objects 430, which are understandable by a VNC internal API 432 in the network controller 420. The internal objects 430 may represent the VN described in the VNDL codes and actions for describing the handling of network events. The internal objects 430 may be saved in an object directory of the network controller 420. The internal objects 430 may be implemented as any codes, data structures, scripts, commands, or other information, as long as the network controller may understand the internal objects 430 sufficiently to perform VN-related tasks.

The execution module 426 may understand how to handle the tasks defined by VNDL codes. Specifically, the execution module 426 may call the VNC internal API 432 (may be considered a southbound API) to perform VN-related tasks according to or based on the internal objects 430 translated from the VNDL codes. The VNC internal API 432 may perform various tasks such as creating, deleting, updating, querying status, and handling aspects of the VN including nodes, ports, links, policies, and events.

If a certain event occurs in the VN controlled by the network controller 420, an event handler 434 may handle the event accordingly. For example, if a network node, a port, or a link between two nodes goes down, the event handler 434 may pass event information to the execution module 426, which may then handle the event using pre-defined policies. The platform in the network controller 420 may be implemented using any suitable language or environment. For instance, a Python runtime module 436 may be used to implement modules, as shown in FIG. 4.

Figure 5A:

FIGS. 5A and 5B illustrate an exemplary XML schema 500 that describes at least parts or some aspects of a VN. One of ordinary skill in the art will understand syntaxes of the XML schema 500, thus further descriptions may focus on novel features disclosed herein. Note that names and settings used in the XML schema 500 are exemplary and non-limiting. The XML schema 500 uses elements to define a plurality of legal names for describing a VN. For example, the XML schema 500 comprises an element 510 named "network" (note that the element 510 crosses multiple code lines). Thus, when a piece of VNDL codes contains the term "network", it may be recognized by a processing entity (e.g., a VNC) as a valid legal name for a VN and may be processed accordingly. Undefined terms such as "networks" may be identified as erroneous.

In practice, a network may be identified by an identification (id) and may comprise network nodes and links therein. To describe a VN in more detail, the element 510 may comprise sub-elements or child elements that define other legal names. For example, a child element 512 named "id" may specify an identification of the VN, a child element 514 named "node" may specify a node within the VN, and a child element 522 named "link" may specify a network link or connection within the VN.

As a node may be identified by an id, an address, a node name, and/or port(s), the element 514 further comprises child elements that describe the node. Specifically, child elements 515, 516, 517, and 518 describe an id, an address, a name, and a port of the node, respectively. Further, the element 518 comprises a child element 519 that describes a name of the port.

Similarly, a link may have various attributes such as a source node, a destination node, and a bandwidth. To describe a link represented by element 522, a child element 523 named "from" specifies a source node of the link, a child element 524 named "to" specifies a destination node of the link, and a child element 525 named "bandwidth" specifies a network bandwidth assigned to the link.

Figure 6B:
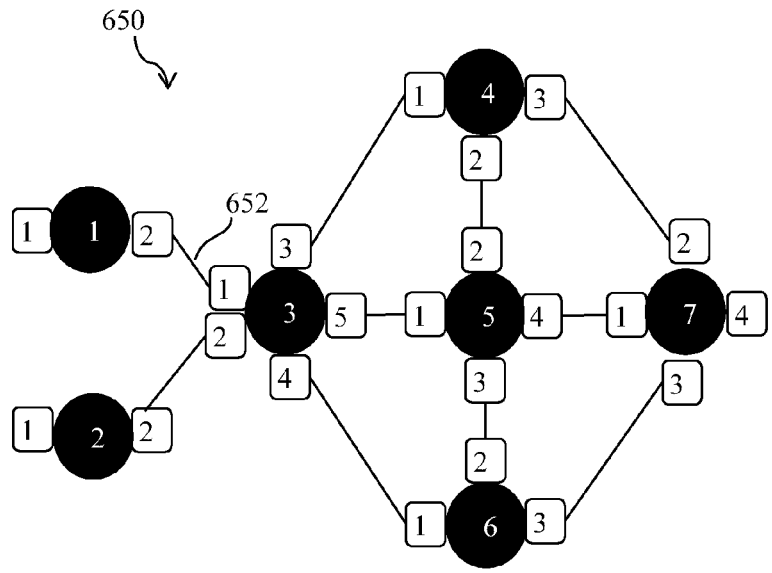
FIG. 6B illustrates the VN created using the program codes shown in FIG. 6A.

FIG. 6A illustrates an exemplary piece of program codes 600 that describes an exemplary VN 650, and FIG. 6B illustrates the VN 650, which may be created using the program codes 600. Using a declarative approach disclosed herein, an application developer may follow an XML schema (e.g., the XML schema 500) to write the program codes 600. The program codes 600 may be sent by an application (e.g., the application 410) to a network controller (e.g., controller 420), which may then create the VN 650 according to the program codes 600.

Legal names defined in the XML schema may be capitalized in program codes. As shown in FIG. 6A, legal names including node, port, link, and bandwidth (BW) are capitalized. Based on the program codes 600, the network to be created has an exemplary name "Test" and comprises seven network nodes named 1-7. For example, line 610 of the program codes 600 specifies that Node 1 comprises two ports named Port 1 and Port 2, which are shown in FIG. 6B with nodes represented by dark-filled circles and ports represented by oval boxes attached to the circles.

In addition, links may be setup between ports. For example, line 620 of the program codes 600 comprises "Link 1.2=3.1", which sets up a link (shown as link 652 in FIG. 6B) from Node 1: Port 2 to Node 3: Port 1. Note that the line 620 further specifies that a bandwidth of 1 gigabytes (G) is to be allocated to the link 652. Other nodes, ports, and links may be setup in the same way using the program codes 600.

One of ordinary skill in the art will understand that the program codes written in VNDL may be fully extensible to include other information such as descriptions for handling events and enforcing policies set by applications. As various events may occur in a VN, their handling policies may be configured by application developers and specified in VNDL codes. For example, when a network node malfunctions, VNDL codes may define a policy to restore the node or find an alternative node. A port or a link between ports can be handled similarly. For another example, when physical link utilization exceeds a certain percentage, a policy may move a related VN link from the physical link to another physical link. For yet another example, when an interface drop count reaches a certain threshold, a policy may choose to use another interface. Overall, the principles disclosed herein may be applied to countless other example events and policies.

By using a declarative programming language instead of a procedural one, application developers may perform VN tasks without knowing or understanding the details of networks. A network controller translating the VNDL codes may guarantee the desired network and behaviors of the network. Applications developers may use a RESTful API to communicate with a VNC, and operate a VN through the VNC. For example, VNDL codes may be used to query the status of a node, a port, or a link. VNDL codes may also be used to conduct operations such as adding or removing a specific node, port, or link.

The declarative approach may bring about various benefits. Programmer productivity may be increased (e.g., length of program codes has be reduced by 90% in experiments), programming accuracy may be improved as programmers can focus on the declarative statements rather than detailed steps, and visibility may be improved with a concise network description and behavior as developers can use the declarative statement to build visual diagram of networks.

Figure 7:
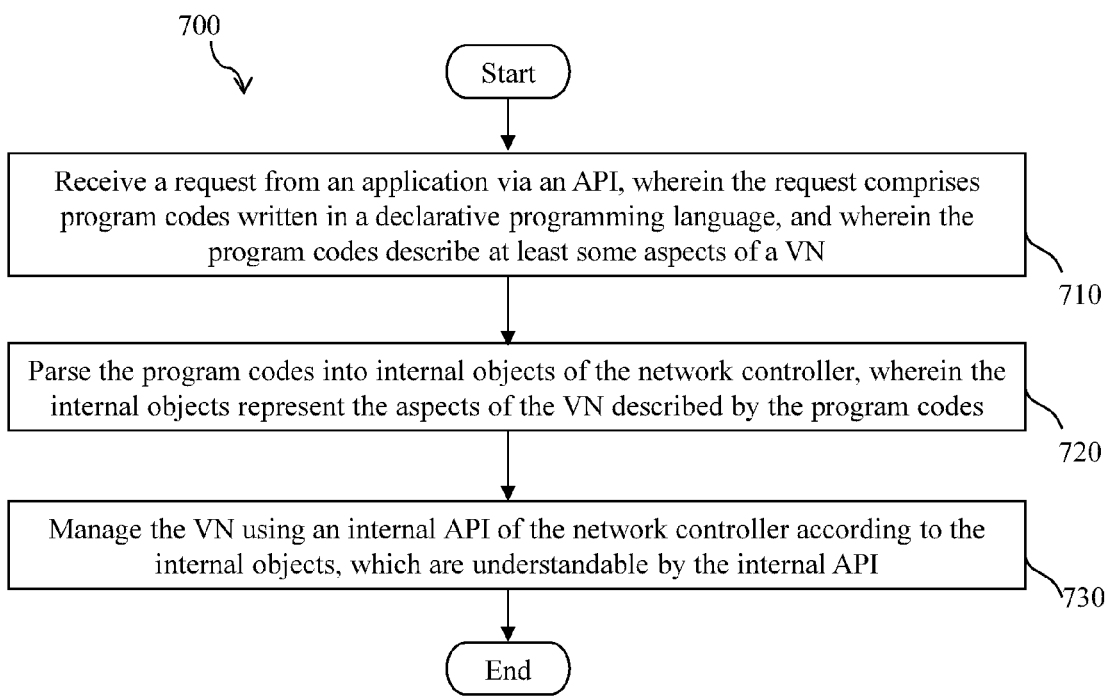
FIG. 7 is a flowchart of an example embodiment of a VN management method.

FIG. 7 is a flowchart of an example embodiment of a VN management method 700, which may be implemented by a network controller (e.g., the PNC 220, the PNC 230, the VNC 240, the controller 320, or the controller 420). The method 700 starts from step 710, where the network controller may receive a request from an application via an API. The request may comprise program codes written in a declarative programming language, and the program codes may describe at least some aspects of a VN. Depending on the need of the application, the program codes may contain different contents. For example, the program codes may comprise instructions for creating the VN, one or more policies for operating the VN, or definition of events occurring in the VN. In an example embodiment, the declarative programming language may use an XML schema with defined legal names, and the legal names used in describing the VN may comprise one or more of node, port, link, bandwidth, policy, and event. Further, the application may be remotely coupled to or co-located at a same place with the network controller, thus receiving may be remote or local.

In step 720, the network controller may parse the program codes into internal objects of the network controller. The internal objects represent the aspects of the VN described by the program codes. Parsing may be implemented in any suitable manner to translate or convert the VNDL codes into the internal objects.

In step 730, the network controller may manage the VN using an internal API of the network controller according to the internal objects, which are understandable by the internal API. Note that managing the VN may encompass creating the VN, updating the VN, managing policies of the VN, and handling events occurring in the VN. It should be understood that the method 700 serves as an example embodiment, thus alternatives may be used to modify the method 700 and additional steps may be incorporated as necessary.

Figure 8:
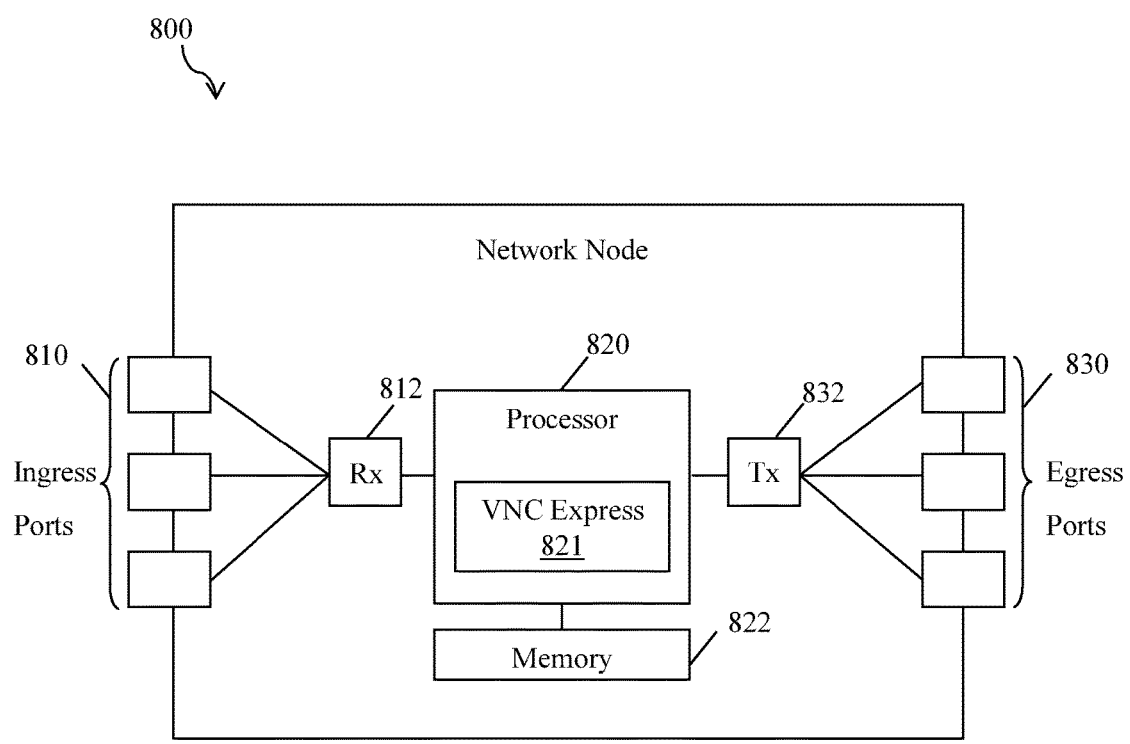
FIG. 8 is a schematic diagram of an example embodiment of a network device.

FIG. 8 is a schematic diagram of an example embodiment of a computer system or network device 800. The network device 800 may be implemented as any suitable device, such as a network node running applications or a network controller (e.g., the PNC 220, the PNC 230, the VNC 240, the controller 320, or the controller 420) disclosed herein. The network device 800 may be capable of receiving, processing, and transmitting information-carrying messages such as VN-related requests to and from a network. The network device 800 may comprise one or more ingress ports 810 coupled to a receiver (Rx) 812, which may be configured for receiving requests, responses, program codes, and other information from other network components. The network device 800 may further comprise one or more egress ports 830 coupled to a transmitter (Tx) 832, which may be configured for transmitting requests, responses, program codes, and other information to other network components The network device 800 may comprise a logic unit or processor 820 that is in communication with the receiver 812 and the transmitter 832. The processor 820 may be implemented using hardware or a combination of hardware and software. The processor 820 may be implemented as one or more central processor unit (CPU) chips, cores (e.g., a multi-core processor), field-programmable gate arrays (FPGAs), application specific integrated circuits (ASICs), and/or digital signal processors (DSPs). The processor 820 may be configured to implement any of the functional modules or units described herein, such as the web server 221, web server 241, the VNC service module 242, the TAL service module 243, the RC service modules 244, the VNC express module 245, the HTTP server 422, the main module 424, the execution module 426, the parser 428, the VNC internal API 432, the event handler 434, and the Python runtime module 436, or any other functional component known by one of ordinary skill in the art, or combinations thereof. For example, a VNC express module 821 may incorporated into the processor 820 and configured to process VNDL codes for VN tasks.

The network device 800 may further comprise at least one memory 822, which may be configured to store data such as program codes and internal objects of a VNC. Note that, in practice, there may be bidirectional traffic processed by the network device 800, thus some ports may both receive and transmit packets. In this sense, the ingress ports 810 and the egress ports 830 may be co-located or may be considered different functionalities of the same ports that are coupled to transceivers (Rx/Tx). The processor 820, the memory 822, the receiver 812, and the transmitter 832 may also be configured to implement or support any of the example embodiments described above, such as the VN management method 700.

It is understood that by programming and/or loading executable instructions onto the network device 800, at least one of the processor 820 and the memory 822 are changed, transforming the network device 800 in part into a particular machine or apparatus (e.g. a network node having the functionality taught by the present disclosure). The executable instructions may be stored on the memory 822 and loaded into the processor 820 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (e.g., floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories such as mask ROM, programmable ROM (PROM), erasable PROM, flash ROM, and random access memory (RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one example embodiment is disclosed and variations, combinations, and/or modifications of the example embodiment(s) and/or features of the example embodiment(s) made by a person having ordinary skill in the art are within the scope of the disclosure. Alternative embodiments that result from combining, integrating, and/or omitting features of the example embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are example embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

I claim:

1. A method implemented by a network controller for virtual network (VN) management, the method comprising:
receiving, via an application programming interface (API), a request comprising program codes written in a declarative programming language describing aspects of a VN in terms of logics and goals and not describing how to accomplish the goals as a sequence of programming language primitives;
converting the program codes into internal objects of the network controller, wherein the internal objects represent the aspects of the VN described by the program codes, wherein the aspects of the VN comprise at least one of network nodes, ports on the network nodes, or links between the ports, and wherein the program codes comprise instructions for creating the VN; and
creating the VN using an internal API of the network controller according to the internal objects, which are understandable by the internal API.

2. The method of claim 1, wherein creating the VN comprises setting up at least one of the network nodes, the ports, the links, and bandwidths assigned to the links.

3. The method of claim 1, wherein the program codes comprise one or more policies for operating the VN, and wherein the method further comprises enforcing the one or more policies using the internal API of the network controller according to the internal objects.

4. The method of claim 1, further comprising handling one or more events occurring in the VN according to the internal objects, wherein handling the events comprises using the internal API of the network controller.

5. The method of claim 1, further comprising communicating with additional network controllers managed by the network controller to operate the VN, wherein the request received by the network controller is generated by an application operated by an application developer and remotely coupled to the network controller via the API, and wherein the API is a Representational State Transfer (RESTful) API.

6. The method of claim 1, wherein the declarative programming language uses an extensible markup language (XML) schema with defined legal names, wherein the legal names used in describing the VN comprise one or more of node, port, link, bandwidth, policy, and event, and wherein the declarative programming language lacks a need to explicitly specify each detailed step in order to perform a task.

7. A computer program product comprising computer executable instructions stored on a non-transitory computer readable medium such that when executed by a processor cause a network controller to:
obtain, from an application via an application programming interface (API), a request comprising program codes written in a declarative programming language that describe aspects of a virtual network (VN) in terms of defined names and provide instructions for creating the VN by specifying task objectives for the aspects of the VN without specifying detailed steps required to accomplish the task objectives;
convert the program codes into internal objects of the network controller, wherein the internal objects represent the aspects of the VN described by the program codes, wherein the aspects of the VN comprise at least one of network nodes, ports on the network nodes, or links between the ports, and wherein the program codes comprise one or more policies for operating the VN; and enforce the one or more policies using an internal API of the network controller according to the internal objects.

8. The computer program product of claim 7, wherein the API is a Representational State Transfer (RESTful) API, and wherein the network controller comprises a VN controller (VNC) express module implemented using Python and configured to parse the program codes into the internal objects.

9. The computer program product of claim 7, further comprising instructions that cause the network controller to create the VN using the internal API of the network controller according to the internal objects, which are understandable by the internal API.

10. The computer program product of claim 7, wherein creating the VN comprises setting up at least one of the network nodes, the ports, the links, and bandwidths assigned to the links.

11. The computer program product of claim 7, wherein the computer program product further comprises instructions defined in terms of logics and goals and not describing how to accomplish the goals as a sequence of programming language primitives that cause the network controller to enforce the one or more policies using the internal API of the network controller according to the internal objects.

12. The computer program product of claim 7, further comprising instructions that cause the network controller to handle one or more events occurring in the VN according to the internal objects, wherein handling the events comprises using an internal API of the network controller.

13. The computer program product of claim 7, wherein the declarative programming language uses an extensible markup language (XML) schema with defined legal names, wherein the legal names used in describing the VN comprise one or more of node, port, link, bandwidth, policy, and event, and wherein the declarative programming language lacks a need to explicitly specify each detailed step in order to perform a task.

14. An apparatus comprising:
  a receiver configured to receive, via an application programming interface (API), a request comprising program codes written in a declarative programming language describing aspects of a virtual network (VN), wherein the program codes comprise instructions for creating the VN and one or more policies for operating the VN by expressing a logic of computations of the aspects of the VN that do not describe a detailed control flow for the VN, and wherein the declarative programming language lacks a need to explicitly specify each detailed step in order to perform a task; and
  a processor coupled to the receiver and configured to:
    convert the program codes into internal objects of the apparatus, wherein the internal objects represent the aspects of the VN described by the program codes, and wherein the aspects of the VN comprise at least one of network nodes, ports on the network nodes, or links between the ports; and
    handle one or more events occurring in the VN according to the internal objects, wherein handling the events comprises using an internal API of the network controller.

15. The apparatus of claim 14, further comprising a transmitter coupled to the processor and configured to transmit commands to one or more additional network controllers for operating the VN, wherein the commands are generated by the processor based on the internal objects, wherein the additional network controllers are coupled to and managed by the apparatus, which serves as a higher-layer VN controller (VNC).

16. The apparatus of claim 14, wherein the processor is further configured to manage the VN according to the internal objects, wherein managing the VN comprises creating the VN, updating the VN, managing policies of the VN, and handling the one or more events occurring in the VN.

17. The apparatus of claim 16, wherein operating the VN comprises configuring at least one of the network nodes, the ports, the links, and bandwidths assigned to the links.

18. The apparatus of claim 14, wherein the API is a Representational State Transfer (RESTful) API, and wherein the processor comprises a VN controller (VNC) express module implemented using Python and configured to parse the program codes into the internal objects.

19. The apparatus of claim 14, wherein the declarative programming language uses an extensible markup language (XML) schema with defined legal names, and wherein the legal names used in describing the VN comprise one or more of node, port, link, bandwidth, policy, and event.

* * * * *